April 25, 1933.   J. F. PENDERGAST ET AL   1,906,091
PARACHUTE
Filed Nov. 22, 1930   3 Sheets-Sheet 1
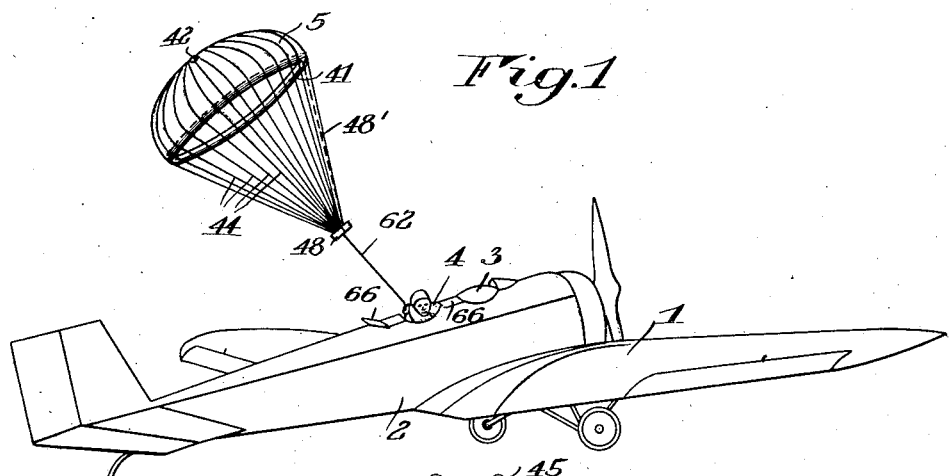
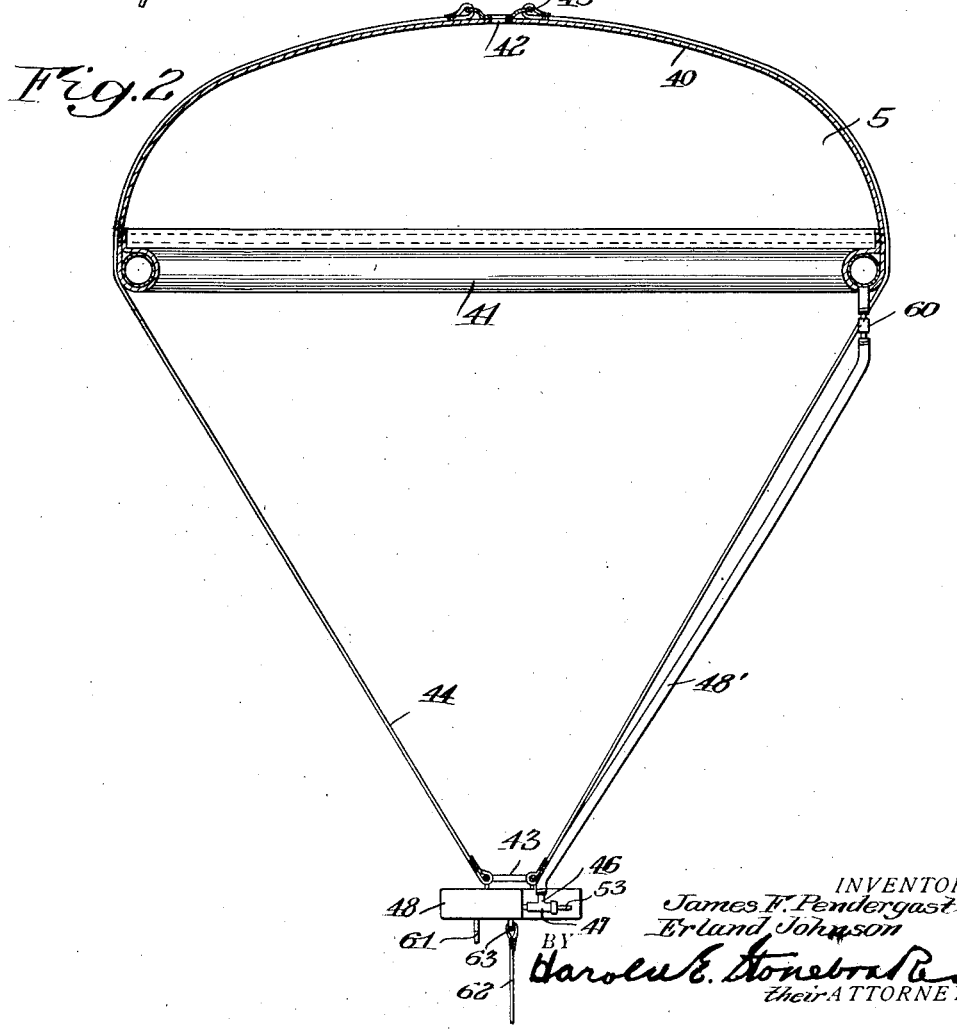
INVENTORS
James F. Pendergast
Erland Johnson
BY Harold E. Stonebraker
their ATTORNEY

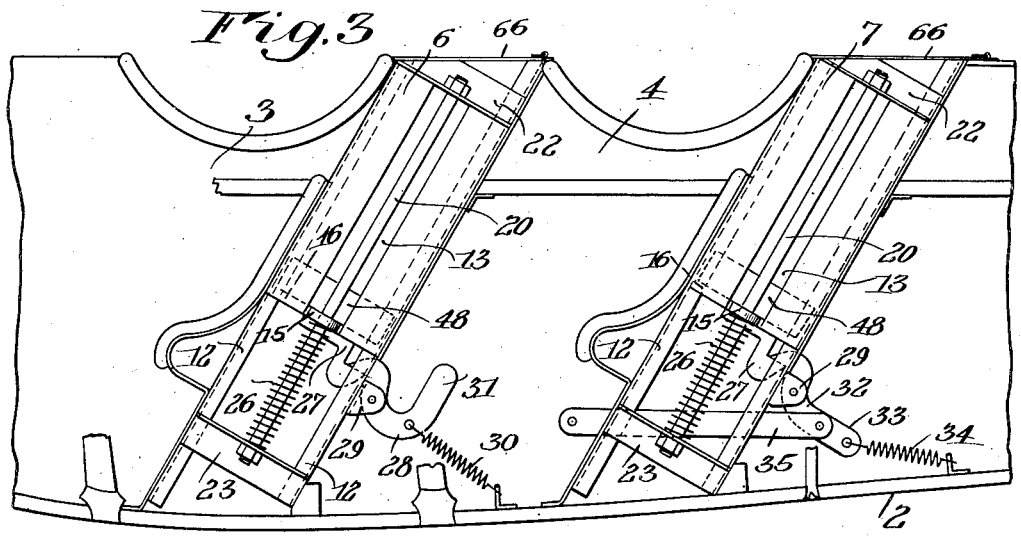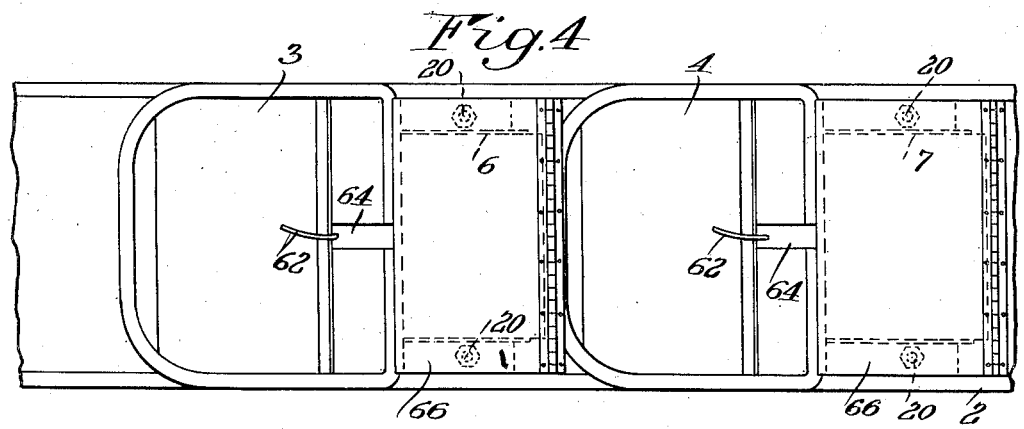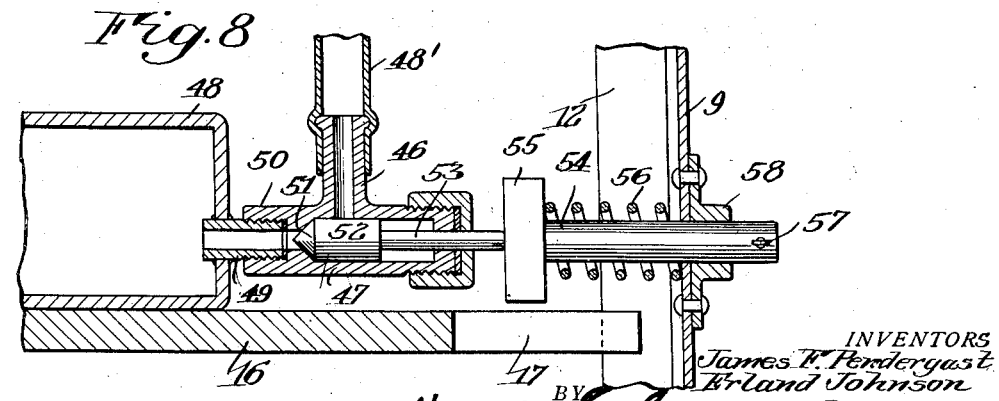

April 25, 1933.   J. F. PENDERGAST ET AL   1,906,091
PARACHUTE
Filed Nov. 22, 1930   3 Sheets-Sheet 3
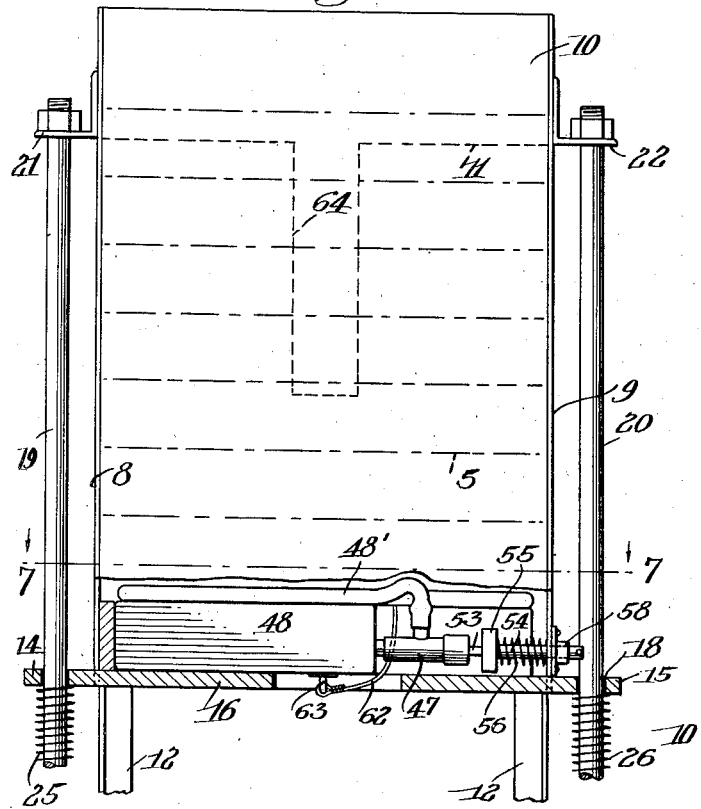
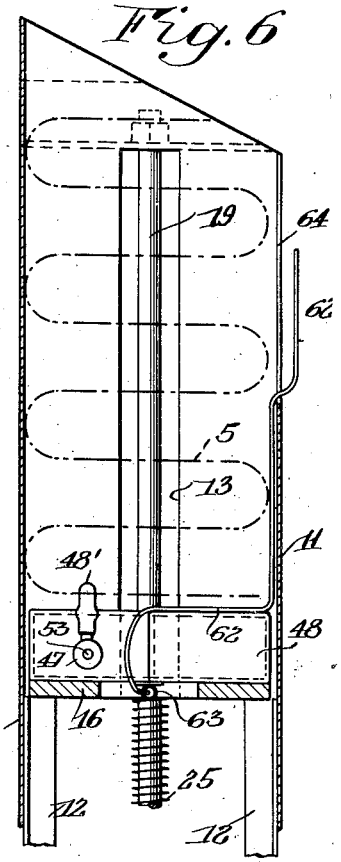
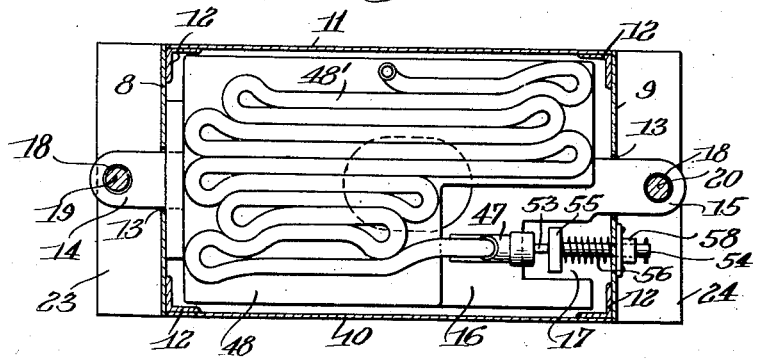
INVENTORS
James F. Pendergast
Briand Johnson
BY Harold R. Stonebraker
Their ATTORNEY Patented Apr. 25, 1933

1,906,091

UNITED STATES PATENT OFFICE

JAMES F. PENDERGAST, OF LEICESTER, AND ERLAND JOHNSON, OF GENESEO, NEW YORK

PARACHUTE

Application filed November 22, 1930. Serial No. 497,393.

This invention relates to improvements in parachutes, and particularly to parachutes of the kind used for landing from an airship when the same gets out of control or for any reason cannot make a safe landing, or which may be used to safely land the airship itself.

The principal object of this invention is to provide a parachute of this kind which is reliable, simple in construction, and economical to make.

Another object of the invention is to provide a parachute of this kind which is automatically expanded when ejected from an airship, such expansion being independent of the action of the atmosphere, and hence making it possible to land from low altitudes.

Still another object of the invention is to provide a suitable pocket or receptacle on the airship in which a collapsed parachute may be stored, means being provided for ejecting the parachute therefrom in an emergency and automatically setting in action devices for expanding the same.

A still further object of the invention is to provide a parachute which may be ejected from an airship and automatically expanded to raise a person secured thereto from a descending airship.

To these and other ends, the invention consists in the construction and arrangement of parts that will appear from the following description when read in conjunction with the accompanying drawings, the novel features being pointed out in the claims at the end of the specification.

In the drawings:

Fig. 1 is a perspective view of an airplane and a parachute connected with the pilot, illustrating one possible embodiment of the invention;

Fig. 2 is an enlarged central vertical section of the parachute shown in Fig. 1;

Fig. 3 is an enlarged longitudinal vertical section of the airplane showing receptacles in which the parachutes may be stored and means for ejecting them, parts being broken away to conserve space and for clearness;

Fig. 4 is a plan view of the same;

Fig. 5 is an enlarged central transverse section of one of the receptacles, parts being broken away;

Fig. 6 is a similar view, the section being taken at substantially right angles to the plane of Fig. 5;

Fig. 7 is a sectional view taken substantially on line 7—7 of Fig. 5 and looking in the direction of the arrows at said line, and Fig. 8 is a sectional detail view somewhat enlarged of a valve which controls the admission of fluid to the expanding means.

Referring particularly to the drawings in which like reference numerals refer to the same part in all the figures, 1 indicates an airship of conventional form, a monoplane being shown for purposes of illustration only, as the invention is readily applicable to many different types of airships. Said airship comprises a body portion 2 having a cockpit with a forward compartment 3 for a passenger, and a rear compartment 4 for a pilot. A parachute, generally referred to by the numeral 5, is shown in Fig. 1 attached to the pilot.

Inclined upwardly and rearwardly behind each of said compartments and secured in the cockpit are pockets, receptacles or chutes 6 and 7. Each of said chutes is substantially rectangular in cross-section, as seen in Fig. 7, and comprises side walls 8 and 9 and front and rear walls designated respectively by the numerals 10 and 11. The walls of the chute are preferably constructed of sheet material and secured to angle irons 12 at the corners of the chute by welding or other suitable means.

Each of the side walls 8 and 9 is slotted at 13 intermediate their side edges to provide a clearance for laterally projecting arms or extensions 14 and 15 on an ejector in the form of a plunger 16 movable longitudinally in the chute. The ejector 16 is substantially rectangular in form and has a cut-away portion 17 therein for a purpose which will presently appear. Each of the arms 14 and 15 is provided with an opening or perforation 18 whereby the opposite ends of the ejector slidably engage the rods 19 and 20 on which it is mounted. The rods 19 and 20 are mounted on brackets 21 and 22 projecting laterally from the walls 8 and 9 of the chute adjacent the upper ends of the rods, and similar brackets 23 and 24 projecting laterally from said walls. In the construction illustrated, the rods 19 and 20 are arranged in openings in the brackets 21 to 24 through which they project and are threaded at their ends for the reception of nuts, whereby they are secured in the brackets.

Means are provided for forcibly moving the ejectors upwardly in the chutes. This could be done in a number of different ways, such as hydraulically or pneumatically, or by resilient means, such as illustrated in the drawings. For this purpose, expansion springs 25 and 26 are coiled about the rods 19 and 20 and at their lower ends engage the brackets 23 and 24 and at their upper ends engage the arms 14 and 15 of the ejector. When the ejector is moved inwardly or downwardly, the springs are compressed, as shown in Fig. 3, and when released, the ejector is forced upwardly by reason of the expansion thereof.

It is desirable to retain the ejector in depressed position against the action of the springs, which retaining means may be releasable and under the control of the pilot. To this end, a keeper 27, see Fig. 3, is secured to the under side of the ejector 16 by any suitable means such as welding, and cooperating with said keeper is a latch 28 pivoted on a bracket 29 projecting rearwardly from the rear wall of the chute. The latch 28 is held in the normal engaging position shown in Fig. 3 by resilient means in the form of a spring 30 secured at one end to the latch and anchored at its other end to a bracket fixed to the bottom of the cockpit or other suitable fixed support. The rear end of the latch has an operating portion 31 conveniently arranged for engagement by the foot of the pilot.

The chutes 6 and 7 are substantially alike in construction; however, the chute 7 is in rear of the pilot and it is therefore desirable to provide means for actuating its latch 32 within convenient reach of the pilot. To this end, the latch 32 has a downwardly and rearwardly projecting arm 33 resiliently connected with a fixed part by means of a contractile spring 34. A link 35 is connected to the arm 33 and extends forwardly to the front of the chute 7, where it may be connected with a lever or other suitable means conveniently actuated by the pilot.

It will be noted from an inspection of Fig. 3 of the drawings that the springs 30 and 34 retain the latches in normal position to engage the keepers 27 and retain the ejectors in depressed position against the action of the springs 25 and 26. When the latches are released from the keepers, the springs 25 and 26 operate to move the ejector upwardly to forcibly eject any article resting thereon, such as the folded parachute 5, upwardly and rearwardly of the airship. The interengaging parts of the latches and keepers are so formed that when an ejector is again depressed it engages the latch and swings it from its path against the action of its spring, which moves it automatically into engagement with the keeper.

The parachute 5 comprises an upper portion or cap 40 of a web of fine, closely woven silk, cotton or other suitable material adapted to form a dome-shaped air container when inflated, as shown in Fig. 2. At its lower edge, said web is connected to an endless collapsible tube 41 which may be of rubber, rubberized silk or other suitable material impervious to air or gas, for a purpose presently to be described. An opening 42 is provided centrally in the top of the dome or cap and serves as an air valve to steady the descent of the parachute. The dome is connected to a central bottom ring 43 by means of suitable cords 44 secured at one end to the ring 43 and at the other end to a ring 45 surrounding the opening 42.

Thus constructed, the parachute is collapsible and when collapsed may be inserted in one of the chutes 6 and 7 and supported on its ejector 16, to be ejected thereby when released, as previously explained. Means are provided for automatically expanding the parachute when so released. To this end, the collapsible tube 41 is connected with an arm or nipple 46 on a valve 47 by means of a flexible collapsible tube 48' which may be constructed of rubber or other suitable material. 48 is a gas tank constructed of suitable material and capable of containing air, gas or other suitable expansible light fluid under relatively high pressure, and suitably connected to the parachute. In the embodiment illustrated, it is secured to the ring 43.

The tank or reservoir 48 is of substantially the form of the cross-section of the chute, as seen in Fig. 7, except that it is cut away at one corner to form a clearance space for the valve 47, so that it may be slidably mounted in the chute. A nipple 49 projects from the reservoir into said clearance space and is threaded on its outer end for cooperation with the internally threaded end of the arm 50 of the tubular valve member 47. The connection between the members 49 and 50 may be sealed by means of a gasket, as shown, if desired. At its inner end, the arm 50 has a conical valve seat with which the conical end 51 of a valve member 52 cooperates. The member 52 is substantially cylindrical in form and is slidably mounted in the valve 47. At its other end, it has a stem 53 which projects outwardly through an opening in the end of the valve in which it is slidable. As shown, the opening in the end of the valve may be sealed by means of a gasket, if desired.

Means are provided for retaining the valve member 52 against its valve seat when the parachute is collapsed and mounted in the chute, said means being automatically released when the parachute is ejected. To this end, a plunger 54 is slidably mounted in the wall 9 of the chute and at its inner end has an enlarged head 55 adapted to engage the outer end of the valve stem 53. Resilient means in the form of a spring 56 coiled about the plunger 54 and at one end engaging its head and seated against the inner wall of the chute serves to press the valve inwardly against its seat. A stop 57 on the outer end of the plunger is adapted to engage the wall of the chute or a bearing 58 thereon in which the plunger moves and limits the movement of the plunger under the action of its spring. By this construction, the gas tank and the valve mounted thereon are free to move from the chute, which movement disengages the valve stem from the head of the plunger and permits the valve member 52 to slide from its seat under the action of the gas pressure in the tank 48. This movement also opens a passage into the nipple 46 and the tube or conductor 48', which passage is normally closed by the valve member 52. When the valve is thus opened, the compressed air or gas in the tank 48 is permitted to expand and passes out through the nipple 46 and tube 48' into the tubular ring until its pressure is equalized throughout its mass. But the pressure in the tank 48 should be sufficient to inflate the ring 41 and expand it, and with it the lower open side or mouth of the dome or cap 40. This action takes place as soon as the parachute is ejected from the chute and operates automatically to expand the parachute independently of the action of the atmosphere, which is the usual agent for expanding parachutes of the kind as heretofore constructed. If desired, a check valve, such as the valve 60, may be inserted in the connection between the ring 41 and the gas tank to maintain a constant pressure in the ring 41. 61 is a valve nipple through which air or gas may be pumped into the tank 48. The ejector 16 is cut away at 17 to provide a clearance for the plunger 54.

Means are also provided for connecting the parachute to a harness worn by the person in the cockpit. Said means comprises a cord 62 secured to a ring 63 projecting from the bottom of the tank. When the parachute is collapsed and arranged in the chute, as shown in Fig. 6, said cord extends from the ring 63, which projects into an opening provided therefor in the ejector, to the front wall of the chute and then upwardly between the wall of the chute and the parachute therein to a point intermediate the top and bottom of the chute, and then forwardly through an opening or slot 64 in the wall of the chute. The slot 64 is open at its top so that the cord may freely pass upwardly and outwardly therefrom with the parachute or tank to which it is attached at one end. The other end of said cord is connected to the harness of a person in the cockpit. If desired, the open tops of the chutes may be closed by hinged lids 66 to protect the contents from the weather. Said lids may be arranged to swing outwardly with the parachute when the latter is ejected.

From the above, it will be understood that in case of emergency, one of the latches 29 may be actuated to release the ejector which operates under the action of its springs to throw the parachute from its chute into the air above the cockpit. At the same time, the tank 48 moves with it and releases the valve member 52 which is then actuated by the pressure in the tank to open the passage to the ring 41 which is inflated by the expansion of the gas confined in the tank and expands the parachute to the shape shown in Fig. 1 of the drawings. In this form, it is caught by the atmosphere and lifts the person to whom the cord 62 is attached from the cockpit.

Although only one embodiment of the invention is shown and described herein, it will be understood that this application is intended to cover such changes or modifications as come within the spirit of the invention or scope of the following claims.

We claim:

1. A parachute comprising a dome, a flexible collapsible ring secured to the edge of said dome, a source of fluid pressure, means connecting said source of fluid pressure with said ring for conducting fluid under pressure thereto, a pressure operated valve in said connection, and automatically releasable means for retaining said valve in closed position.

2. The combination with an airship, of a parachute thereon, means for ejecting the parachute from the airship, an expansible ring for expanding the parachute when ejected from the airship, a source of fluid pressure, means connecting said source with said expansible ring for conducting fluid pressure thereto, a pressure actuated valve for controlling the flow of fluid through said connecting means, a plunger on the airship for closing said valve against the action of the fluid pressure, and resilient means for controlling said plunger.

3. The combination with an airship, of a chute therein, a parachute in said chute, means for ejecting the parachute therefrom, an expansible ring for expanding the parachute when ejected, a source of fluid pressure, means connecting said source with said expansible ring for conducting fluid pressure thereto, a fluid pressure actuated valve for controlling the flow of fluid from said source to the expansible ring, a plunger slidably mounted in said chute and engageable with said valve for closing it, and resilient means for controlling said plunger.

4. The combination with an airship, of a parachute thereon, means for ejecting the parachute from the airship, an expansible fluid pressure container for expanding the parachute when ejected from the airship, a source of fluid pressure movable with the parachute, means connecting said source with said expansible container for conducting fluid pressure thereto, a fluid pressure actuated valve for controlling the flow of fluid through said connecting means, and means on the airship for closing said valve against the action of said fluid pressure, said means being rendered ineffective by the ejection of the parachute from the airship.

5. The combination with an airship, of a chute therein, a parachute in said chute, an ejector for ejecting the parachute from the chute, means for securing the parachute to an occupant of the airship, pneumatic means for expanding the parachute, and means on the airship arranged to render said expanding means ineffective to expand the parachute but rendered effective by a movement of the ejector to eject the parachute from the chute.

In witness whereof, we have hereunto signed our names.

JAMES F. PENDERGAST.
ERLAND JOHNSON.